United States Patent
Youn

(10) Patent No.: US 7,554,911 B2
(45) Date of Patent: Jun. 30, 2009

(54) METHOD FOR CONTROLLING PLAY SPEED IN AN OPTICAL DISC DEVICE

(75) Inventor: Jeong Chae Youn, Kyunggi-do (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 1016 days.

(21) Appl. No.: 10/749,405

(22) Filed: Jan. 2, 2004

(65) Prior Publication Data

US 2004/0141438 A1    Jul. 22, 2004

(30) Foreign Application Priority Data

Jan. 3, 2003    (KR) ..................... 10-2003-0000339

(51) Int. Cl.
*H04L 12/26* (2006.01)
(52) U.S. Cl. ................. 370/232; 369/47.33; 369/47.41; 369/47.44; 369/47.46
(58) Field of Classification Search ............. 369/47.28, 369/47.38, 54, 47.34, 47.44, 47.55, 53.37, 369/30.23, 30.24, 47.46, 47.41, 53.31–53.36
See application file for complete search history.

(56) References Cited

U.S. PATENT DOCUMENTS

| | | | | |
|---|---|---|---|---|
| 5,970,208 A | * | 10/1999 | Shim | 386/126 |
| 5,995,462 A | * | 11/1999 | Harold-Barry | 369/53.18 |
| 6,032,276 A | * | 2/2000 | Tomishima | 714/723 |
| 6,115,337 A | * | 9/2000 | Takagi et al. | 369/47.33 |
| 6,269,059 B1 | * | 7/2001 | Kuroda et al. | 369/47.28 |
| 6,493,298 B1 | | 12/2002 | Youn | |
| 6,747,927 B2 | * | 6/2004 | Suetomo et al. | 369/47.38 |

FOREIGN PATENT DOCUMENTS

| | | |
|---|---|---|
| CN | 1187669 A | 7/1998 |
| CN | 1284717 A | 2/2001 |
| KR | 1998-41235 A | 8/1998 |
| KR | 20010055053 A | 7/2001 |

* cited by examiner

*Primary Examiner*—Wing F Chan
*Assistant Examiner*—Otis L Thompson, Jr.
(74) *Attorney, Agent, or Firm*—Birch, Stewart, Kolasch & Birch LLP

(57) ABSTRACT

A method is provided for controlling a play speed in an optical disc device in which the current play speed is rapidly lowered when the address information of an optical disc such as a CD or DVD is abnormally detected under the condition in which the transfer rate of data temporarily stored in a buffer is a basic speed 1×, and in a sequential play mode for sequentially reading and reproducing A/V data recorded on the optical disc, thereby being capable of efficiently preventing discontinuous reproduction of A/V data caused by the repetition of pause and play operations during the sequential play operation.

11 Claims, 2 Drawing Sheets

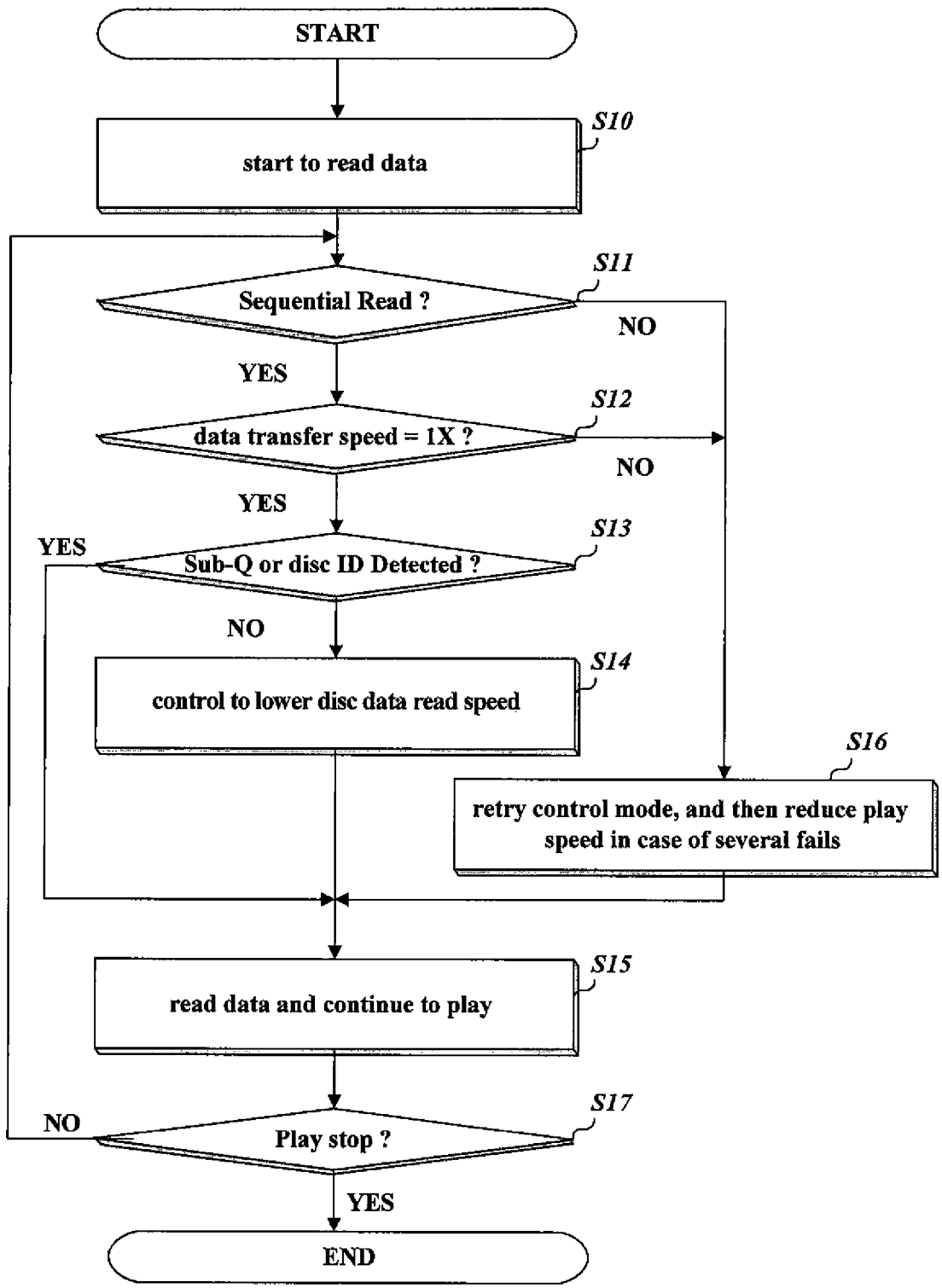

METHOD FOR CONTROLLING PLAY SPEED IN AN OPTICAL DISC DEVICE

The present application claims, under 35 U.S.C. § 119, the priority benefit of Korean Patent Application No. 10-2003-0000339 filed Jan. 3, 2003, the entire contents of which are herein fully incorporated by reference.

BACKGROUND OF THE INVENTION

1. Field of the Invention

The present invention relates to a method for controlling a play speed in an optical disc device in order to variably control the play speed in a sequential play mode for sequentially reading and reproducing A/V data recorded on an optical disc such as a CD or DVD.

2. Discussion of the Related Art

Recently, optical discs capable of recording a large quantity of high-quality audio and video data, such as CDs or DVDs, have been developed and made commercially available. In association with such optical discs, optical disc devices such as CD players or DVD players have also been developed and made commercially available.

Where a sequential play operation for sequentially reading and reproducing A/V data recorded on an optical disc is carried out at the request of a user, the optical disc device first temporarily stores A/V data read from the optical disc in a buffer included in the optical disc device, and then reproduces the temporarily stored A/V data at a data transfer rate corresponding to a basic speed (1×).

On the other hand, where the A/V data recorded on the optical disc is read at a higher speed, for example, an 8× speed (8 times of the basic speed), an overflow of data occurs in the buffer because the rate of data inputted to the buffer is an 8× speed whereas the rate of data outputted from the buffer is a 1× speed. At this time, the optical disc device pauses the operation of reading the A/V data recorded on the optical disc, and again reads the A/V data recorded on the optical disc from the pause position after a predetermined time elapses or when the amount of data temporarily stored in the buffer is reduced to a predetermined reference value or below. Thus, the operation of storing data in the buffer is repeatedly carried out.

Although the operation of reading the A/V data recorded on the optical disc is paused to prevent the overflow of data from occurring in the buffer, and then again performed from the pause position, the reading of data from the optical disc may fail at the re-start of the reading operation due to defects generated at the pause position during a search for the pause position. In this case, re-attempts are made to read data from the pause position on the optical disc. When the number of re-attempts reaches a predetermined value, the data reading is re-attempted at a lower speed.

In this case, the data reading may be possible because data can be read from the optical disc at a low speed in general cases. However, at some point, outputting of reproduced audio and video signals from the buffer may be temporarily stopped because the data in the buffer may be under-run due to the read re-attempts and speed reduction.

SUMMARY OF THE INVENTION

It is an object of the present invention to provide a method for controlling a play speed for an optical disc in an optical disc device in which the current play speed is rapidly lowered when the address information of the optical disc such as a CD or DVD is abnormally detected under the condition in which the transfer rate of data temporarily stored in a buffer is a basic speed 1×, and in a sequential play mode for sequentially reading and reproducing A/V data recorded on the optical disc.

In accordance with one aspect, the present invention provides a method for controlling a play speed in an optical disc device, the method comprising the steps of: (a) reading data from an optical disc; (b) determining whether or not the data reading in the step (a) is a sequential reading operation; and (c) lowering a data read speed of the optical disc in accordance with whether or not the data reading has failed, when the step (b) determines that the data reading is a sequential reading operation.

In accordance with another aspect, the present invention provides a method for controlling a play speed in an optical disc device, the method comprising the steps of: (a) reading data from an optical disc; (b) determining whether or not a play speed of the read data equals a predetermined basic speed; and (c) lowering a data read speed when the play speed equals the predetermined basic speed and the data reading has failed.

In accordance with another aspect, the present invention provides a method for controlling a play speed in an optical disc device, the method comprising the steps of: (a) identifying a transfer rate of data temporarily stored in a buffer and whether or not address information of an optical disc is normally detected, in a sequential play mode for sequentially reading and reproducing data recorded on the optical disc; and (b) selectively varying a current play speed based on the results of the step (a).

In accordance with another aspect, the invention provides an optical disc optical disc device comprising a combination of elements for: reading data from an optical disc; determining whether or not a current data reading from the optical disc is a sequential reading operation; and lowering a data read speed of the optical disc in accordance with whether or not the current data reading has failed, when the current data reading is a sequential reading operation.

In accordance with another aspect, the present invention provides an optical disc device comprising a combination of elements for: identifying a transfer rate of data temporarily stored in a buffer and identifying whether or not address information of an optical disc is normally detected, in a sequential data play mode; and selectively varying a current play speed based on the identifying results.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects, and other features and advantages of the present invention will become more apparent after a reading of the following detailed description when taken in conjunction with the drawings, in which:

FIG. 2 is a flow chart illustrating the play speed controlling method in the optical disc device in accordance with a preferred embodiment of the present invention.

DESCRIPTION OF THE PREFERRED EMBODIMENTS

Figure 1:
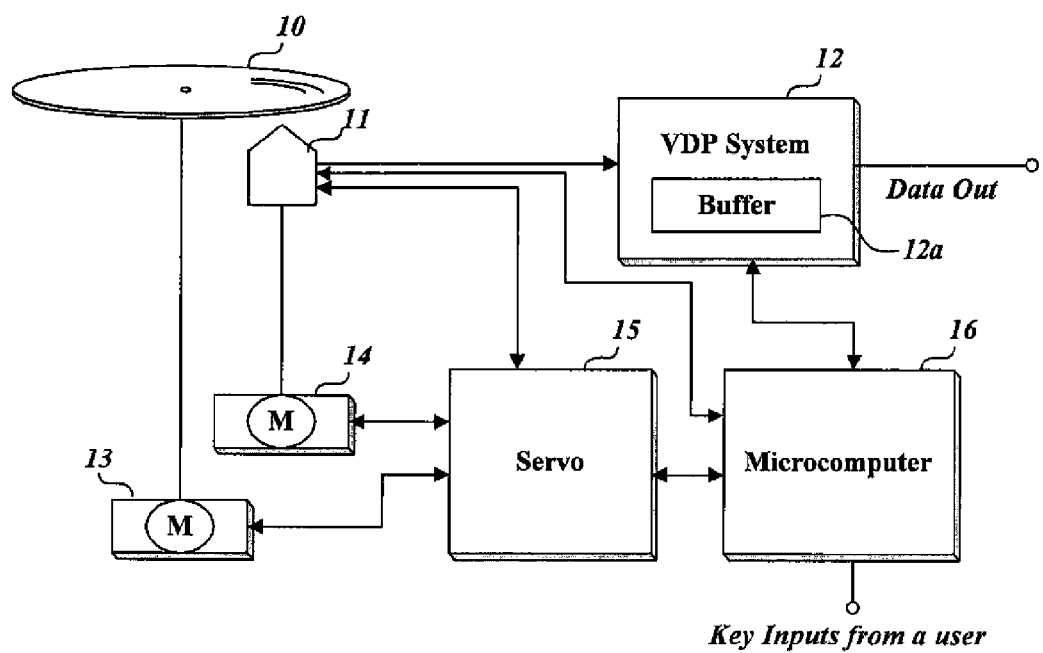
FIG. 1 is a block diagram illustrating the configuration of an optical disc device to which a play speed controlling method according to the present invention is applied.

Now, a method for controlling a play speed in an optical disc device in accordance with a preferred embodiment of the present invention will be described in detail with reference to the annexed drawings.

FIG. 1 illustrates the configuration of an optical disc device to which the play speed controlling method according to the present invention is applied. As shown in FIG. 1, the optical disc device, which may be a CD player or a DVD player, may include an optical pickup 11, a video disc play (VDP) system 12, a spindle motor 13, a sled motor 14, a servo unit 15, and a control unit 16. The control unit 16 may be a microcomputer. All the components of the optical disc device are operatively coupled.

When an optical disc 10 such as a CD or DVD is loaded in the optical disc device having the above described configuration, the servo unit 15 performs initial servo operations for controlling the spindle motor 13 and sled motor 14 to rotate the optical disc 10 at a high speed and to shift the optical pickup 11 to a predetermined initial position.

The VDP system 12 performs a reproduction signal processing operation for converting data read from the optical disc 10 by the optical pickup 11 into original audio and video signals. The VDP system 12 includes a buffer 12a for temporarily storing the data read from the optical disc 10.

The control unit 16 controls the servo unit 15 and VDP system 12 at the request of a user. The control unit 16 also identifies the transfer rate (outputting rate) of data temporarily stored in the buffer 12a, while identifying whether or not the address information of the optical disc 10 is normally detected in a sequential play mode for sequentially reading and reproducing the data on the optical disc 10.

Where the address information of the optical disc 10 is abnormally detected under the condition in which the transfer rate of data outputted from the buffer 12a is a 1× speed, a play speed controlling method for rapidly lowering the current play speed is carried out. A play speed herein is the speed of reading data directly from the optical disc. This procedure will be described in detail hereinafter.

FIG. 2 is a flow chart illustrating the play speed controlling method in the optical disc device of FIG. 1 in accordance with the present invention. In accordance with this method, when an optical disc 10 such as a CD or DVD is loaded in the optical disc device, the control unit 16 of the optical disc device controls the servo unit 15 to perform initial servo operations for driving the spindle motor 13 and sled motor 14, while performing a data reproducing operation at the request of a user (S10).

In accordance with the data reproducing operation, A/V (audio/video) data recorded on the optical disc 10 is read by the optical pickup 11, and then temporarily stored in the buffer 12a included in the VDP system 12. The temporarily-stored A/V data is subsequently reproduced into and outputted as original audio and video signals. Where the reproducing operation requested by the user is a sequential play operation for sequentially reading and reproducing A/V data (S11), and the transfer rate of data outputted from the buffer 12a included in the VDP system 12 corresponds to a predetermined basic speed, e.g., 1× speed (S12), the control unit 16 discriminates that the current data read mode is a sequential play mode.

The sequential play operation may be a play operation to be carried out when the addresses of data blocks requested in accordance a data read command are sequential. A representative example of such a sequential play operation is a play operation for general audio CDs. Of course, where a play operation is carried out in accordance with program chains, as in DVDs, determination of such a sequence may be carried out in a manner different from the above described manner.

Once it is discriminated that the current data read mode is a sequential play mode, it is determined whether the address information of the optical disc is normally or abnormally detected in the sequential play mode, upon reading data directly from the optical disc 10, e.g., upon re-trying to read data from the disc 10 following the temporal stopping of the read operation made in response to the overflow of data occurring in the buffer 12a. Particularly, it is discriminated (S13) whether or not the address information of the optical disc 10 is normally detected, for example, by identifying whether or not sub-queue (sub-Q) information is normally detected in the case where the optical disc 10 is a CD, or by identifying whether or not disc identification (ID) information is normally detected in the case where the optical disc 10 is a DVD. This can be accomplished by having the microcomputer examine data directly from the disc 10.

When it is determined that the address information of the optical disc is abnormally detected (e.g., no sub-Q information/ID information detected at step S13), this indicates that the reading data from the disc 10 has failed or has errors. As a result, the current data read speed for reading data directly from the disc 10 is directly lowered to a lower speed without any re-try for reading the sub-Q or disc ID information (S14). That is, a speed controlling operation is carried out at step S14. For example, where the current data read speed for the disc 10 is an 8× speed, then it is lowered to a 4× speed or below at step S14. On the other hand, where the current data read speed for the disc 10 is a 4× speed, it is lowered to a 2× speed or below at step S14. Lowering the data read speed for the disc 10 ensures that the disc reading operation is properly performed without errors. After step S14, step S15 (discussed below) is performed.

On the other hand, where it is determined at step S13 that the address information of the optical disc is normally detected (indicating a normal data reading from the disc 10), the current data read speed for the disc 10 is maintained. Under this condition, the A/V data temporarily stored in the buffer 12a is accessed, and then reproduced into original audio and video signals (S15).

Meanwhile at step S11, where the play operation requested by the user is adapted not to reproduce the A/V data recorded on the optical disc into original audio and video signals, but is for copying the A/V data onto another recording medium or another appliance (that is, where the play operation is a data copying operation), it is discriminated that the current data read mode is a data copy mode. Thereafter, the A/V data temporarily stored in the buffer 12a is read and transmitted at a high speed. When reading of data from the disc fails due to defects on the optical disc or other factors at this time, a conventional re-try play control operation is carried out (S16) by temporarily stopping the operation of reading data, repeating, a predetermined number of times, the operation for reading the recording position where the reading of data has failed, and lowering the current data read speed to a lower speed for reading data from the disc.

Thereafter, the above operation is repeatedly carried out until the user requests stopping of the play operation, or until the reproduction of data recorded on the optical disc is completed (S17).

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As apparent from the above description, the present invention provides a method for controlling a play speed in an optical disc device in which the current play speed for reading data directly from the disc is rapidly lowered when the address information of an optical disc such as a CD or DVD is abnormally detected under the condition in which the transfer output rate of data temporarily stored in a buffer is a basic speed 1×, and in a sequential play mode for sequentially reading and reproducing A/V data recorded on the optical disc, thereby being capable of efficiently preventing a discontinuous reproduction of A/V data caused by the repetition of pause and play operations during the sequential play operation.

What is claimed is:

1. A method for controlling a play speed in an optical disc device, the method comprising the steps of:
   (a) reading data from an optical disc;
   (b) determining whether or not the data reading in the step (a) is a sequential reading operation;
   (c) lowering a data read speed of the optical disc if the data reading has failed, when the step (b) determines that the data reading is a sequential reading operation; and
   (d) selectively varying a current play speed based on the results of the step (b), when the step (b) determines that the data reading is not a sequential reading operation.

2. The method according to claim 1, wherein the step (c) comprises the step of:
   lowering the data read speed without any read re-try when it is determined that the data reading has failed.

3. The method according to claim 1, wherein the data reading in the step (a) is carried out at a read speed higher than the play speed, where the play speed is a predetermined basic speed.

4. The method according to claim 3, wherein the predetermined basic speed is a 1× speed.

5. The method according to claim 1, further comprising:
   (e) storing the data read in the step (a) temporarily and sequentially in a buffer; and
   wherein the data reading is stopped when an overflow occurs in the buffer, and is resumed from a position where the data reading has stopped previously after a predetermined time elapses or when the data in the buffer is reduced to a predetermined amount or less.

6. The method according to claim 5, wherein the step (c) lowers the data read speed, if the data reading has failed when the data reading is resumed from the stopped position in the step (a).

7. The method according to claim 1, wherein the determination of whether or not the data reading has failed is based on whether or not a reading of data addresses from the optical disc has failed.

8. The method according to claim 7, wherein the data addresses are sub-Q information when the optical disc is a CD, or ID information when the optical disc is a DVD.

9. An optical disc device comprising:
   a data reading unit configured to read data from an optical disc;
   a determining unit configured to determine whether or not a current data reading from the optical disc is a sequential reading operation;
   a data read speed adjusting unit configured to lower a data read speed of the optical disc if the current data reading has failed, when the current data reading is a sequential reading operation; and
   a play speed adjusting unit configured to selectively vary a current play speed based on a result from determining whether or not the current data reading from the optical disc is the sequential reading operation.

10. The optical disc device according to claim 9, wherein the determination of whether or run the current data reading has failed is based on whether or not a reading of data addresses from the optical disc has failed.

11. The optical disc device according to claim 10, wherein the data addresses are sub-Q information when the optical disc is a CD, or ID information when the optical disc is a DVD.

* * * * *